No. 864,638. PATENTED AUG. 27, 1907.
G. GESSERT.
FENDER FOR CAR WHEELS.
APPLICATION FILED APR. 6, 1907.
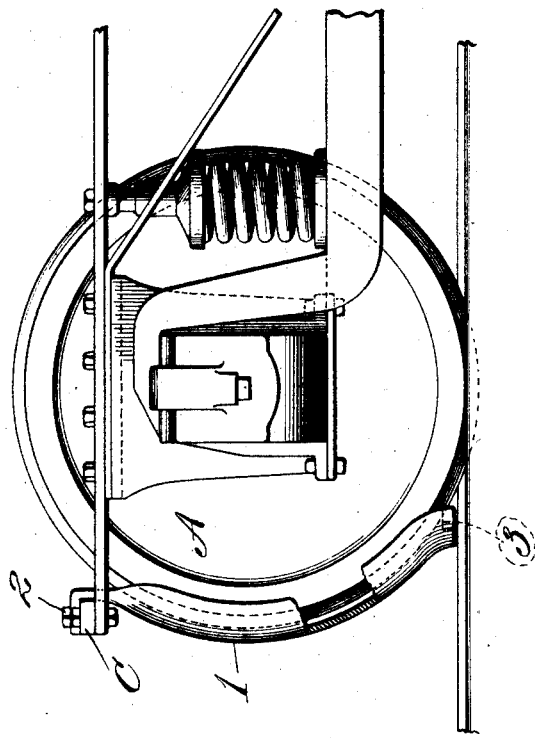
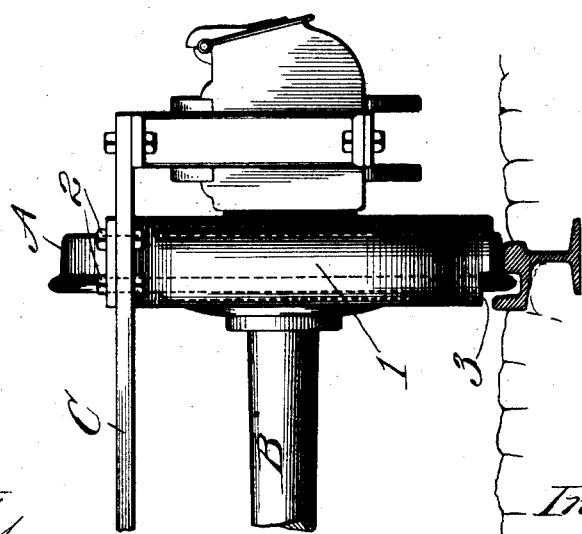

UNITED STATES PATENT OFFICE.

GEORGE GESSERT, OF EDWARDSVILLE, ILLINOIS.

FENDER FOR CAR-WHEELS.

No. 864,638.　　　　　Specification of Letters Patent.　　　　Patented Aug. 27, 1907.

Application filed April 6, 1907. Serial No. 366,720.

*To all whom it may concern:*

Be it known that I, GEORGE GESSERT, a citizen of the United States of America, residing in Edwardsville, in the county of Madison and State of Illinois, have invented certain new and useful Improvements in Fenders for Car-Wheels, of which the following is a full, clear, and exact description, reference being had to the accompanying drawing, forming part of this specification.

My invention relates to a fender for use upon car trucks as guards for the wheels of said trucks to discharge obstructions from railway rails particularly those of street railways in order that they may not remain in positions to impede the even travel of the car wheels or dislodge such wheels from the rails with the resultant damage or wreckage of the car by which the wheels are carried. The fender also has the utility of saving a human life by preventing the passage of a car wheel over the body of a person when thrown upon a railway rail.

Figure I is a front elevation of a portion of a railway car truck including one of its wheels and with my fender applied to the truck. Fig. II is a side elevation of the parts shown in Fig. I with the fender illustrated partially in section.

A designates a car wheel, B an axle carried by said wheel. C is a transverse member of a car truck of which the wheel A and axle B also constitute parts. The construction of the members described and the remainder of the car truck which is undescribed, may be of any ordinary construction, no invention being herein claimed for the truck by itself considered.

1 designates a fender that is carried by the car truck by reason of its being secured to the transverse member C by bolts 2 or other suitable means of attachment. The fender 1 is of curving form in horizontal cross section and is suspended in close proximity to the periphery of the wheel A so that it will partially inclose the sides of said wheel, as seen in Fig. II. The fender has a vertical lower end which extends downwardly to a point near that at which the tread or periphery of the wheel rides upon the track rail of a railway, thereby causing it to serve as a means for throwing any object that may be encountered by it off of said track rail and preventing the wheel from passing over such object.

It is to be noted that by making the fender of curved shape in cross section it is furnished with curving sides that are adapted to strike against any object that may be encountered while lying upon the railway track rail and that, as a consequence, such object is readily thrown to one side of the rail when it is moved from a position directly over the rail.

In order that the lower end of the fender may extend into close proximity with the top of the track rail on which the wheel A rides and without any liability of the fender striking against the guard rails that are common to railway rails at curves in the railway track, I provide the fender at its vertical lower end with a notch 3 thus rendering the fender of a less length at its portion which travels over the car rail than at its portion that travels over the tread of the track rail which receives the wheel A.

I claim:

The combination with a car truck and a wheel thereof, of a fender of curving form in horizontal cross section and having a vertical lower end and suspended from said truck adjacent to said wheel; the vertical lower end of said fender being provided at its lower end with a notch at its inner side, substantially as and for the purpose set forth.

GEORGE GESSERT.

In presence of—
　LILY ROST,
　WM. H. SCOTT.